(12) United States Patent
Agrawal et al.

(10) Patent No.: US 12,278,172 B2
(45) Date of Patent: Apr. 15, 2025

(54) SUBSTRATE FRAME DESIGN FOR THREE-DIMENSIONAL STACKED ELECTRONIC ASSEMBLIES AND METHOD FOR THE SAME

(71) Applicant: Applied Materials, Inc., Santa Clara, CA (US)

(72) Inventors: Akash Agrawal, San Jose, CA (US); Prashanth Ganeshbaabu, Bengaluru (IN)

(73) Assignee: Applied Materials, Inc., Santa Clara, CA (US)

( * ) Notice: Subject to any disclaimer, the term of this patent is extended or adjusted under 35 U.S.C. 154(b) by 41 days.

(21) Appl. No.: 17/851,754

(22) Filed: Jun. 28, 2022

(65) Prior Publication Data

US 2023/0420351 A1  Dec. 28, 2023

(51) Int. Cl.
*H01L 23/498* (2006.01)
*G06F 30/398* (2020.01)
(Continued)

(52) U.S. Cl.
CPC ...... *H01L 23/49833* (2013.01); *G06F 30/398* (2020.01); *H05K 1/181* (2013.01); *H05K 3/301* (2013.01); *G06F 2115/12* (2020.01); *H01L 25/105* (2013.01); *H01L 25/50* (2013.01); *H05K 2201/10378* (2013.01);
(Continued)

(58) Field of Classification Search
CPC .... H05K 1/11; H05K 1/14; H05K 1/141–144; H05K 1/18; H05K 1/181–187; H05K 2201/10378; H05K 2201/10515; H05K 2201/10522; H05K 2201/1053; H05K 2201/2018; H01L 23/552; H01L 23/498; H01L 23/49833
USPC .............. 361/770–795; 257/660–690; 174/258–262
See application file for complete search history.

(56) References Cited

U.S. PATENT DOCUMENTS 6,472,735 B2 * 10/2002 Isaak ............... H05K 1/141
257/777
7,258,549 B2 * 8/2007 Asahi ............. H01R 13/2414
439/91

(Continued)

OTHER PUBLICATIONS

International Search Report and Written Opinion for Application No. PCT/US2023/025712, mailed Oct. 10, 2023, 8 pages.

*Primary Examiner* — Tuan T Dinh
(74) *Attorney, Agent, or Firm* — Kilpatrick Townsend & Stockton LLP

(57) ABSTRACT

In order to relieve the stress on the substrates in a 3D stacked electronic assembly, a substrate frame is divided into a plurality of frame sections that are separated by spaces between the frame sections. These separations allow the substrates to expand/contract in response to temperature variations and other environmental conditions, and generally allow the substrates to move in one or more axial directions. The separations between the substrate portions are design-specific for each substrate design. The placement of IC packages on either side of the substrate is analyzed to identify areas of maximal warpage through physical measurements, physical model simulations, or using a trained neural network. The spaces in the substrate frame are then be placed next to or aligned with the areas of maximal warpage to reduce the stress on the substrate.

15 Claims, 11 Drawing Sheets

(51) Int. Cl.
 *H05K 1/18* (2006.01)
 *H05K 3/30* (2006.01)
 *G06F 115/12* (2020.01)
 *H01L 25/00* (2006.01)
 *H01L 25/10* (2006.01)

(52) U.S. Cl.
 CPC .............. *H05K 2201/10515* (2013.01); *H05K 2201/10522* (2013.01); *H05K 2201/1053* (2013.01); *H05K 2201/2018* (2013.01)

(56) References Cited

U.S. PATENT DOCUMENTS

| | | | |
|---|---|---|---|
| 7,829,992 B2 * | 11/2010 | Sugino | H01L 25/105 |
| | | | 257/737 |
| 7,928,550 B2 * | 4/2011 | Wachtler | H05K 1/141 |
| | | | 257/686 |
| 8,018,731 B2 * | 9/2011 | Sakurai | H05K 1/141 |
| | | | 361/728 |
| 8,767,409 B2 * | 7/2014 | Cheng | H05K 1/144 |
| | | | 361/784 |
| 9,167,686 B2 * | 10/2015 | Chen | H05K 1/144 |
| 2005/0260867 A1 * | 11/2005 | Ono | H05K 1/144 |
| | | | 439/65 |
| 2008/0042263 A1 | 2/2008 | Wang et al. | |
| 2009/0152738 A1 | 6/2009 | Sathe et al. | |
| 2011/0253428 A1 | 10/2011 | Lim et al. | |
| 2012/0081864 A1 * | 4/2012 | Sakurai | H01L 23/49827 |
| | | | 361/753 |
| 2014/0312481 A1 * | 10/2014 | Choi | H01L 25/50 |
| | | | 438/109 |
| 2019/0082536 A1 * | 3/2019 | Park | H01R 12/53 |
| 2020/0176431 A1 | 6/2020 | Zhong et al. | |
| 2021/0384113 A1 | 12/2021 | Zhang et al. | |
| 2022/0189864 A1 * | 6/2022 | Yazdani | H01L 25/18 |

\* cited by examiner

SUBSTRATE FRAME DESIGN FOR THREE-DIMENSIONAL STACKED ELECTRONIC ASSEMBLIES AND METHOD FOR THE SAME

TECHNICAL FIELD

This disclosure generally describes substrate frame designs for three-dimensional (3D) stacked electronic assemblies. More specifically, this disclosure describes substrate frame designs that are divided into a plurality of frame sections to relieve stress on the electronic assembly.

BACKGROUND

A chiplet is a modular integrated circuit that is specifically designed to work with other similar modular chiplets to form a larger, more complex processing system. This allows functional blocks to be divided up into different chiplets in a design to provide greater flexibility and modularity during the design process. In contrast to conventional monolithic integrated circuit (IC) designs, chiplet-based designs use smaller independent dyes that are connected together. Each chiplet may be specifically designed to perform individual functions, such as processing cores, graphic processing units, math coprocessors, hardware accelerators, and so forth. Chiplet-based designs also decrease the cost of manufacturing, as a larger die may be divided into smaller chiplets to improve yield and binning. With the increased cost and slowing of Moore's law, conventional monolithic chip development is also becoming less attractive, as chiplets are less expensive and exhibit faster time-to-market production. The emergence of a relatively new chiplet-based ecosystem is beginning to enable an alternative way to design complex systems by integrating pre-tested chiplet dies into a larger package.

In order accommodate a growing number of chiplet-based designs or multiple-IC designs, manufacturers are turning to 3D packaging as a solution for a space-efficient footprint for electronic assemblies. 3D packaging includes the 3D integration of multiple substrates in a vertical stack that are connected through traditional interconnect methods. 3D packaging may include 3D system in package (SiP), 3D wafer level package (3D WLP), among other emerging package designs. However, while vertical stacking in a 3D assembly may reduce the footprint of the overall assembly, these vertical stacks may add to the mechanical stresses experienced by individual substrates. Therefore, improvements are needed in the art.

SUMMARY

In some embodiments, a three-dimensional (3D) stacked electronic assembly may include a printed circuit board; a package substrate; a plurality of integrated circuit (IC) packages that are mounted to the package substrate; and a substrate frame disposed between the printed circuit board and the package substrate in the 3D stacked electronic assembly. The substrate frame may define a cavity inside of the substrate frame and between the printed circuit board and the package substrate. The plurality of IC packages may be mounted to the package substrate inside of the cavity. The substrate frame may be divided into a plurality of frame sections that are separated by spaces between the plurality of frame sections.

In some embodiments, a substrate frame for a 3D stacked electronic assembly may include a first side comprising first interconnects configured to mount to a first substrate with a plurality of integrated circuit (IC) packages mounted to the first substrate. The assembly may also include a second side comprising second interconnects configured to mount to a second substrate such that the substrate frame may be disposed between the first substrate and the second substrate in the 3D stacked electronic assembly and a cavity may be defined inside of the substrate frame and between the first substrate and the second substrate in which the plurality of integrated IC packages are mounted. The assembly may also include a plurality of frame sections that are separated by spaces between the plurality of frame sections.

In some embodiments, a method of assembling a three-dimensional (3D) stacked electronic assembly may include mounting a plurality of integrated circuit (IC) packages to a first substrate; and connecting a substrate frame to the first substrate and to a second substrate. The substrate frame may define a cavity inside of the substrate frame and between the first substrate and the second substrate. The plurality of IC packages may be mounted to the first substrate inside of the cavity. The substrate frame may be divided into a plurality of frame sections that are separated by spaces between the plurality of frame sections.

In any embodiments, any and all of the following features may be implemented in any combination and without limitation. The assembly may also include a second plurality of IC packages. The package substrate may include a first side to which the plurality of IC packages are mounted inside the cavity. The package substrate may include a second side to which the second plurality of IC packages are mounted. The second plurality of IC packages may be mounted to the second side of the package substrate within a footprint of the cavity. The second plurality of IC packages may include fewer IC packages than the plurality of IC packages, thereby causing a warpage in the package substrate. The spaces between the plurality of frame sections of the substrate frame may be located next to the warpage in the package substrate to reduce the warpage. The printed circuit board may extend beyond a footprint of the package substrate. The assembly may also include a second package substrate that may be mounted to the printed circuit board through a second substrate frame. The substrate frame may have a rectangular shape. The spaces that separate the plurality of frame sections may be located on sides of the substrate frame. The spaces that separate the plurality of frame sections may be located at corners of the substrate frame. A width of the plurality of frame sections may be maintained across the spaces between the plurality of frame sections. The spaces between the plurality of frame sections may be located in the substrate frame such that the substrate frame is symmetrical relative to an axis. A width of the plurality of frame sections may be at least five times greater than a length of the spaces between the plurality of frame sections. Identifying the area of the first substrate with the warpage may include measuring a displacement of the area of the first substrate after mounting the plurality of IC packages to the first substrate relative to a displacement of the area of the first substrate before mounting the plurality of IC packages to the first substrate. The method/operations may also include measuring the displacement of the area of the first substrate after connecting the substrate frame to the first substrate to determine whether the displacement of the area has been reduced by mounting the first substrate to the substrate frame. Identifying the area of the first substrate with the warpage may include simulating a 3D model of the first substrate with the plurality of IC packages mounted to the first substrate. The method/operations may also include simulating the 3D model of the substrate frame connected to the 3D model of the first substrate to determine whether the warpage of the area has been reduced by adding the 3D model of the substrate frame. The method/operations may also include determining locations for the spaces between the plurality of frame sections in the substrate frame based on identifying the area of the first substrate with the warpage. The method/operations may also include determining locations for the spaces between the plurality of frame sections in the substrate frame based on output provided by a machine-learning model that is trained to receive locations of the plurality if IC packages and output the locations for the spaces.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Three-dimensional (3D) stacked electronic assemblies may stack multiple substrates on top of each other, with integrated circuit (IC) packages typically mounted on both sides of the substrate. In order to create space between the substrates in the stacked electronic assembly, a substrate frame may be placed between the substrates and around the IC packages to create a cavity between the substrates for the IC packages. Each of these substrates may be subject to internal stresses that cause a warpage to occur in the substrate. This warpage may be exacerbated when the IC packages are not mounted symmetrically on top and bottom of a substrate, or when different numbers of IC packages are mounted on each side of the substrate. Because the substrate frame is a rigid continuous member, the substrate frame tends to restrict expansion and contraction of the connected substrates in all directions, thus further amplifying the warpage of the substrates. Substrate warpage may lead to manufacturing failures, reliability issues, and reduced lifetimes of the electronic assemblies.

In order to relieve the stress on the substrates in a 3D stacked electronic assembly, the substrate frame may be divided into a plurality of frame sections that are separated by spaces between the frame sections. These separations allow the substrates to expand/contract in response to temperature variations and other environmental conditions, and generally allow the substrates to move in one or more axial directions. The separations between the substrate portions may be design-specific for each substrate design. The placement of IC packages on either side of the substrate may be analyzed to identify areas of maximal warpage through physical measurements, physical model simulations, or using a trained neural network. The spaces in the substrate frame may then be placed next to or aligned with the areas of maximal warpage to reduce the stress on the substrate.

As traditional monolithic-based designs become increasingly more expensive to manufacture, chiplets and modular ICs have emerged as a successful alternative in system architectures to improve yields, reduce the cost of manufacture, and improve the modularity of designs. Each IC may include a separate die manufactured from a silicon wafer. Instead of forcing all the functionality of the system (e.g., the central processing unit (CPU), the memory, the graphic processing unit (GPU), various peripherals, etc.) to be manufactured on one large monolithic die, modular systems separate these functionalities out into separate dies that can then be packaged together to perform the same overall functionality. By making individual dies smaller, the yield and manufacturing costs are reduced for the overall system.

Figure 1:
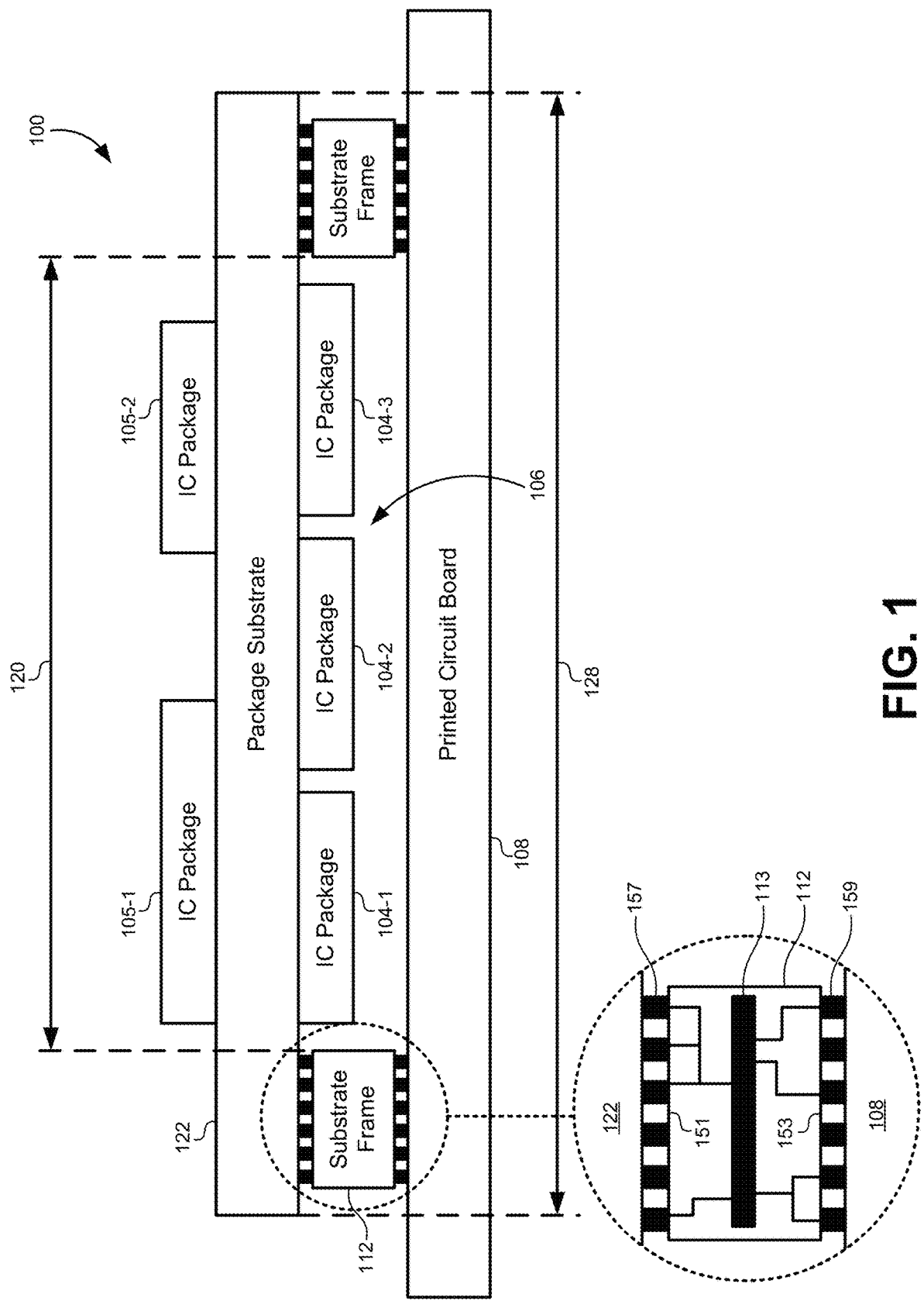
FIG. 1 illustrates a 3D stacked electronic assembly, according to some embodiments.

FIG. 1 illustrates a 3D stacked electronic assembly 100, according to some embodiments. The view of the assembly 100 illustrated in FIG. 1 may represent a cross-sectional view of the assembly 100. The assembly 100 may include a plurality of substrates arranged in a vertical stack. As used herein a "substrate" may include any material to which an electronic component may be mounted. For example, the assembly 100 may include a first substrate, such as a package substrate 122 manufactured from an organic material, a silicon wafer, a glass layer, and/or any other type of substrate material suitable for mounting chiplets or IC dies. Additionally, the assembly 100 may include a second substrate, such as a printed circuit board 108. The printed circuit board 108 may act as a bottom-most layer in the 3D stacked electronic assembly 100. Although not shown explicitly in FIG. 1, other substrates may also be mounted to the printed circuit board 108 in addition to the package substrate 122. For example, additional package substrates may be mounted next to the package substrate 102 to form additional 3D vertical stacks on the printed circuit board 108. Therefore, the area of the printed circuit board 108 may be extend outside of a footprint 128 of the package substrate 122. In this disclosure, any types of substrate may be generically referred to as first, second, etc., substrates, including the package substrate 122, the printed circuit board 108, and/or any other substrates that may be mounted above the package substrate 122 or in other locations on the printed circuit board 108.

A plurality of IC packages may be mounted to the package substrate 122. Typically, the IC packages may be mounted to both sides of the package substrate 122. For example, the package substrate 122 may include a first side (e.g., a bottom side) to which a first plurality of IC packages 104 are mounted. The package substrate 122 may also include a second side (e.g., a top side) to which a second plurality of IC packages 105 are mounted. In some designs, the first plurality of IC packages 104 and the second plurality of IC packages 105 may be mounted such that they are not identical in number, location, and/or size relative to each other on the top and bottom of the package substrate 122. For example, FIG. 1 shows that the top side of the package substrate 122 may include fewer of the IC packages 105 than the IC packages 104 on the bottom of the package substrate 122. Additionally, the IC packages 105 on the top side of the package substrate 122 may be sized differently from the packages 104 on the bottom side of the package substrate 122. The IC packages 105 on the top side may also be placed in different locations compared to the IC packages 104 on the bottom side such that the layout of the IC packages 105 and the resulting signal routing and open space on the top of the package substrate 122 is different from the layout, signal routing, and open space on the bottom of the package substrate 122.

As used herein, the term "IC package" may refer to any integrated circuit that is mounted to a substrate in the 3D stacked electronic assembly 100. For example, an IC package may include an individual integrated circuit die, a chiplet and/or any other similar components. For example, the IC packages 104, 105 may be manufactured as separate dies from one or more silicon wafers. The IC packages 104, 105 may also perform a plurality of different functions, such as an application-specific system-on-a-chip (SOC), a GPU, a digital signal processor (DSP), an artificial intelligence (AI) accelerator, various codecs, Wi-Fi communication modules, memory controllers, memory caches, input/output (I/O) peripherals, and so forth. Although manufactured on separate dies, each of these IC packages 104, 105 may be connected together using various interconnect architectures to perform substantially the same functions as would be performed by a similar monolithic design, but in a distributed manner.

For example, the package substrate 122 may include a high-density interposer layer. The high-density interposer layer may include high-density routing inside of the interposer that connects to pads on a bottom side of the package of the package substrate 122. The high-density interposer layer may be fabricated using organic material, glass, silicon, and/or any other interposer material. The IC packages 104, 105 may communicate with each other through the interposer layer without requiring traffic to pass through any vertical interconnects between different substrates.

A substrate frame 112 may be disposed between the package substrate 122 and the printed circuit board 108. The substrate frame 112 may perform a number of different functions. First, the substrate frame 112 may provide a vertical interconnect solution between the package substrate 122 and the printed circuit board 108. For example, the substrate frame 112 may include a first side (e.g., a top side) with first interconnects 157. The first interconnects 157 may be configured to mount to a first substrate, such as the bottom of the package substrate 122. The substrate frame 112 may also include a second side (e.g., a bottom side) with second interconnects 159. The second interconnects 159 may be configured to mount to a second substrate, such as the top side of the printed circuit board 108.

To provide an interconnect between the package substrate 122 and the printed circuit board 108, some embodiments of the substrate frame 112 may include through-hole interconnects that run directly between locations on the package substrate 122 and the printed circuit board 108. For example, the substrate frame 112 may be formed from an a proxy or other molded material to surround vertical interconnects that extend through the substrate frame 112. In other embodiments, the substrate frame 112 may alternatively or additionally include one or more routing or interconnect layers that route connections from the top of the substrate frame 112 to different locations on the bottom of the substrate frame 112. Some embodiments may include a silicon layer 113 that includes metal layers that provide this routing function. The silicon layer 113 may also include other integrated circuits or circuit components that perform functions using the signals transmitted through the interconnect. Thus, the substrate frame 112 may allow the IC packages 104, 105 to communicate with other components and/or systems that are mounted to the printed circuit board 108.

Another function performed by the substrate frame 112 may be to define a cavity 106 inside the substrate frame 112 and between the package substrate 122 and the printed circuit board 108. The cavity 106 may provide room for the IC packages 104 mounted to the bottom side of the package substrate 122. Although not shown explicitly in FIG. 1, some designs may also include IC packages that are mounted to the top side of the printed circuit board 108. Therefore, the height of the substrate frame 112 may be sized sufficiently to provide space between the IC packages 104 on the bottom of the package substrate 122 and any IC packages mounted to the top side of the printed circuit board 108. In some embodiments, the cavity 106 may enclose the first plurality of IC packages 104 mounted to the bottom side of the package substrate 122. Additionally, even though the second plurality of IC packages 105 mounted to the top side of the package substrate 102 are not enclosed in the cavity 106, these IC packages 105 may be mounted within a footprint 120 of the cavity 106 defined by the substrate frame 112 in some designs. The vertical thickness of the substrate frame 112 may depend on the vertical thickness of the IC packages. For example, IC packages 104 may be about 50 µm to about 750 µm thick, depending on the package. The vertical thickness of the substrate frame 112 may be designed to be at least 50 µm thicker, including the interconnects to provide the cavity 106.

Figure 2:
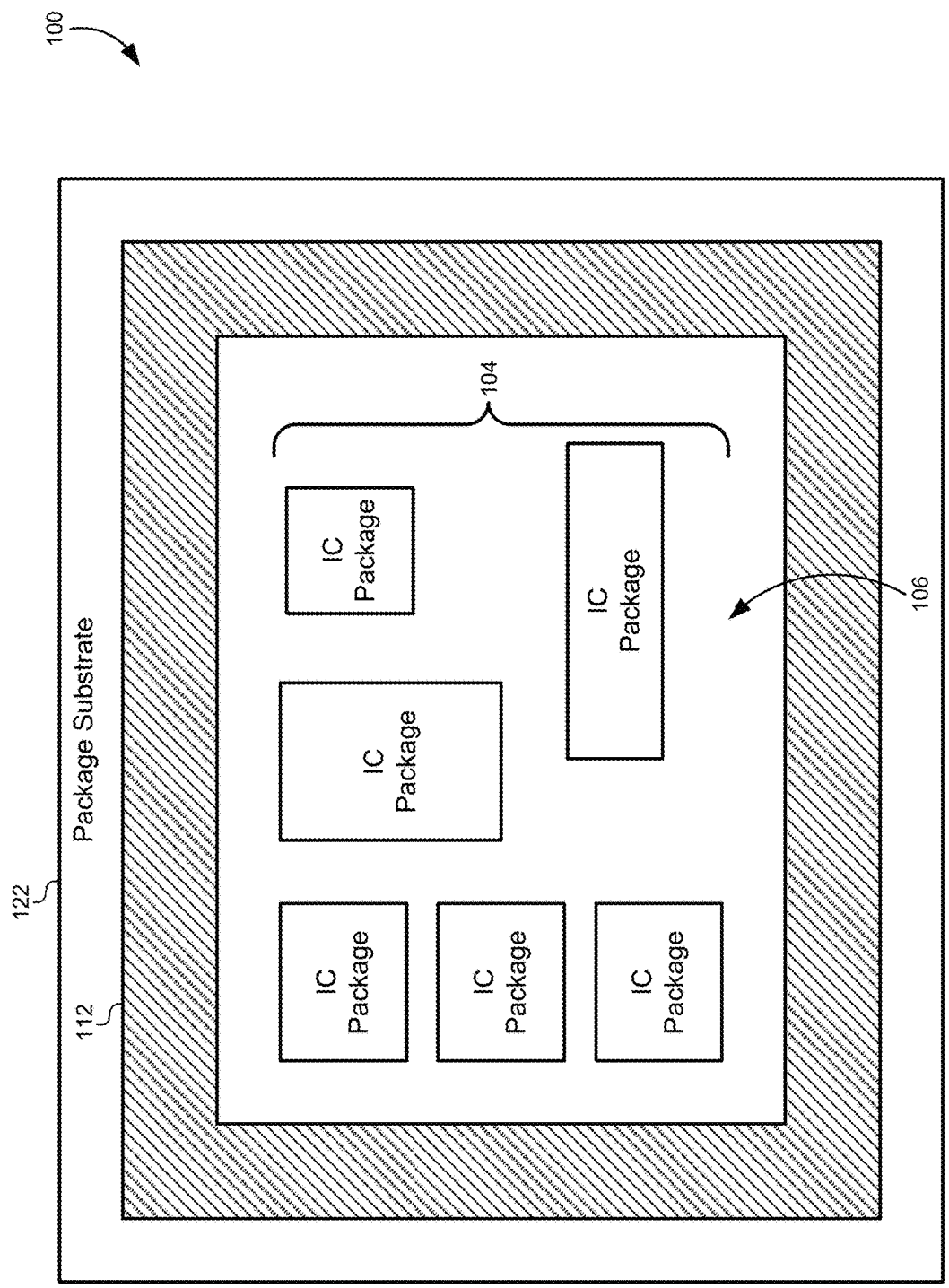
FIG. 2 illustrates an aerial view of the 3D stacked electronic assembly, according to some embodiments.

FIG. 2 illustrates an aerial view of the 3D stacked electronic assembly 100, according to some embodiments. This aerial view of the assembly 100 illustrates how the substrate frame 112 may be manufactured as a single continuous member. The cavity 106 defined by the substrate frame 112 encloses the IC packages 104 that are mounted to the bottom of the printed circuit board. Generally, the substrate frame 112 may form a very rigid structure that is mounted to the periphery of the package substrate 122.

As illustrated in FIGS. 1-2, the IC packages 104 may include IC packages having various sizes, pin counts, mounting locations, mounting techniques, orientations, and/or other physical characteristics. Additionally, the IC packages 104 on the bottom of the package substrate 122 may be different from the IC packages 105 on the top of the package substrate 122. These differences in characteristics between the IC packages 104 on the bottom of the package substrate 122 and the IC packages 105 on the top of the package substrate 122 may cause a stress differential between the top and bottom of the package substrate 122. This stress differential may cause a warpage in the package substrate 122. As used herein, a "warpage" may refer generally to any displacement or deflection of a substrate from a baseline, flat profile. For example, mounting more of the IC packages on one side of the package substrate 122 compared to the other side may cause the package substrate 122 to bow, causing a displacement between the middle of the package substrate 122 and the edges or corners of the package substrate 122. Any warpage in the package substrate 122 may cause reliability issues for the overall assembly 100. For example, this warpage may cause problems such as weakened or separated solder joints, misalignment between mounting pads of the IC packages and the package substrate 122, stress on the IC packages themselves, and/or a number of other mechanical issues that may cause the assembly 100 to fail, either during the manufacturing process or later during use. Therefore, minimizing the warpage and stress on the package substrate 122 represents a technical problem in this area of electronic assembly manufacturing.

It has been discovered that the addition of the substrate frame 112 tends to amplify or exacerbate the stress and warpage of the package substrate 122. For example, a mismatch between Young's modulus and/or the coefficient of thermal expansion of the material used to make the substrate frame 112 compared to the material used in the package substrate 122 may cause the package substrate 122 and the substrate frame 112 to expand/contract very differently in response to changing environmental conditions. Specifically, it has been discovered that the rigidity and monolithic construction of the substrate frame 112 may not allow for sufficient movement for the package substrate 122 in response to changes in temperature, humidity, etc. For example, is been discovered that when the substrate frame is all one piece, it may represent a rigid structure that changes the warpage of the package substrate, and some cases can actually create a warpage profile in the package substrate or enhance an existing warpage of the package substrate. For example, without the substrate frame, a test package substrate may show about 100 μm of warpage, and with the frame this warpage may increase to about 250-300 μm of warpage.

Figure 3:
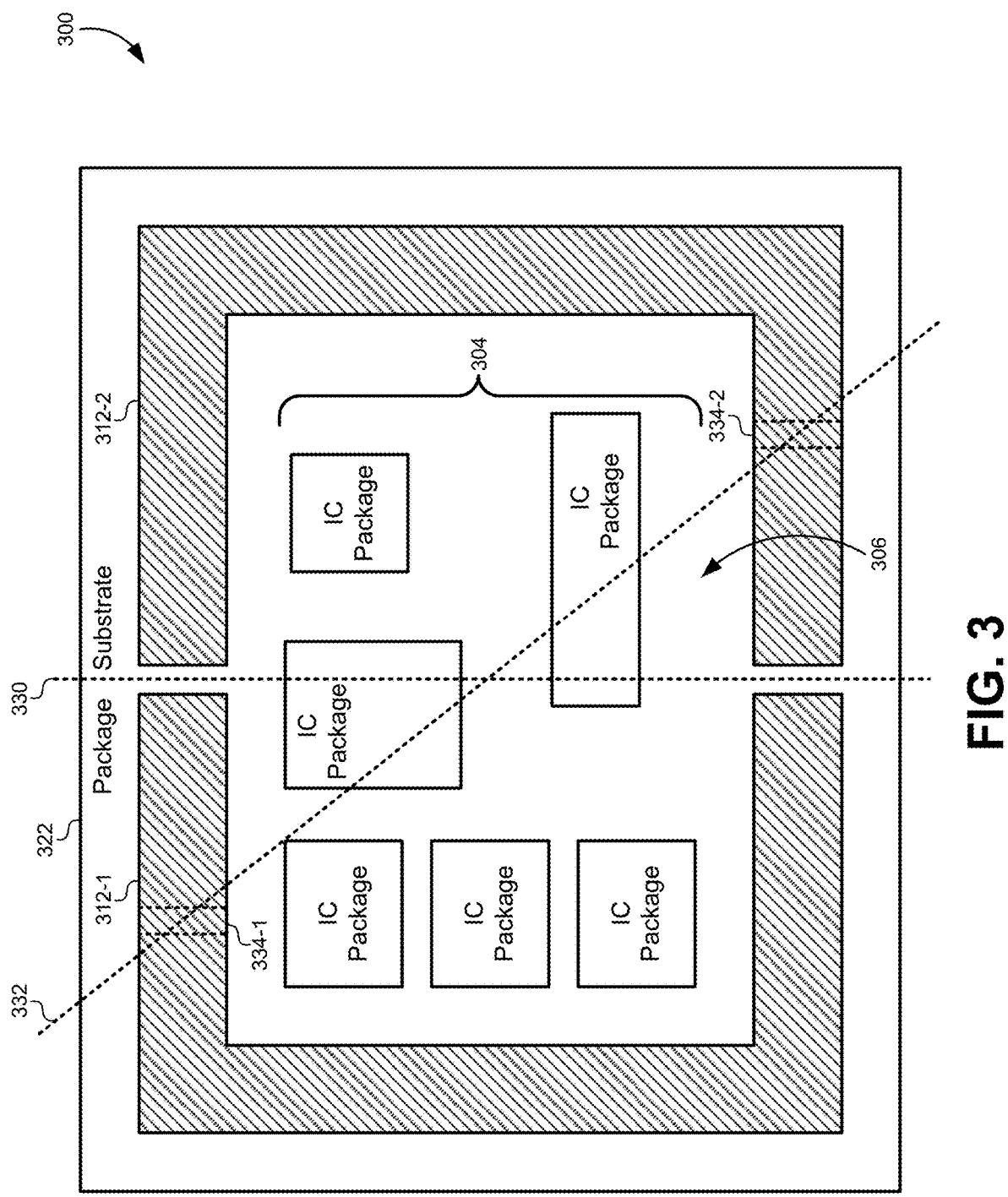
FIG. 3 illustrates a view of a 3D stacked electronic assembly using a substrate frame that is divided into multiple frame sections, according to some embodiments.

FIG. 3 illustrates a view of a 3D stacked electronic assembly 300 using a substrate frame that is divided into multiple frame sections, according to some embodiments. In this example, the substrate frame 312 has been divided into two frame sections 312-1, 312-2. Spaces separate these two frame sections 312-1, 312-2. The placement of the spaces corresponds to a midpoint along a side of the substrate frame 312. When the substrate frame 312 has a rectangular shape as illustrated in FIG. 3, the spaces between the two frame sections 312-1, 312-2 may be located at midpoints on two of the parallel edges of the rectangular shape. Although this particular example places the spaces between the two frame sections 312-1, 312-2 at the midpoint of the edges of the substrate frame, this placement is not meant to be limiting. Other embodiments may place the spaces at any point along edges the substrate frame 312 such that the substrate frame 312 is divided into two frame sections.

Some embodiments may place the spaces between the two frame sections 312-1, 312-2 such that the two frame sections 312-1, 312-2 are symmetrical about an axis passing through a center of the substrate frame 312. For example, the spaces between the two frame sections 312-1, 312-2 in FIG. 3 may be aligned such that the two frame sections 312-1, 312-2 are symmetrical about a vertical axis 330 as well as a horizontal axis (not shown). Other embodiments may place the spaces between the frame sections according to other axes passing through a center of the assembly 300. For example, locations 334 for the spaces between the frame sections may be used in alignment with the axis 332 illustrated in FIG. 3. This axis 332 may be rotated through the center of the assembly 300 to place the locations 334 at any symmetrical location.

Figure 4:
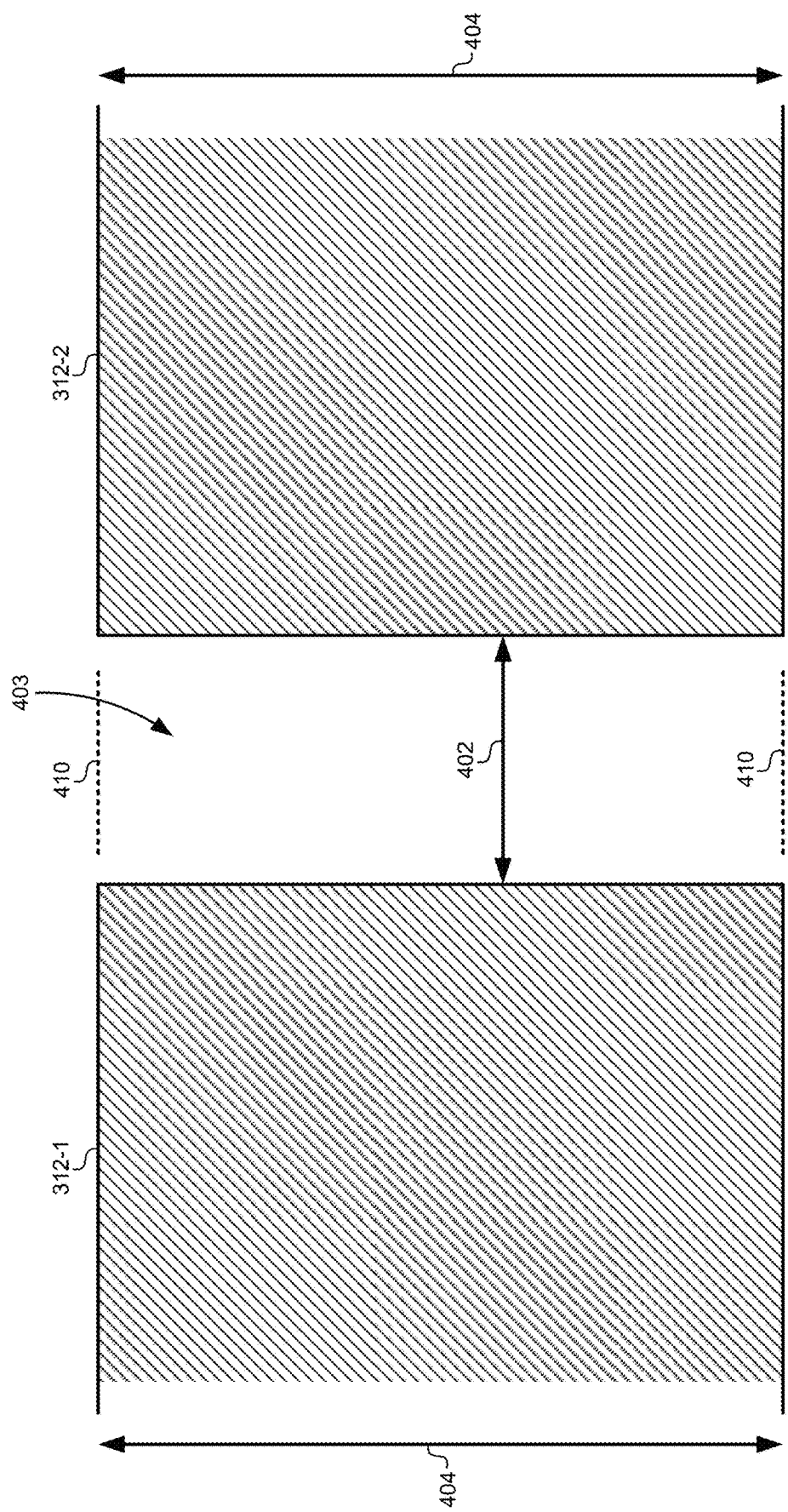
FIG. 4 illustrates a view of a space between the two frame sections, according to some embodiments.

FIG. 4 illustrates a view of a space 403 between the two frame sections 312-1, 312-2, according to some embodiments. In some embodiments, the substrate frame 312 may be distinguished from individual risers or interconnects that are not part of a unified frame design. For example, the substrate frame 312 may maintain a same width 404 across the space 403 that divides one frame section from another frame section (i.e., the top and bottom of the frame sections may be aligned across the space 403). Thus, the footprint 410 of the substrate frame 312 that extends through the space 403 may still define the boundaries of the cavity within which the IC packages are mounted.

In some embodiments, the length 402 of the space 403 may be about 1 mm. Alternatively, some embodiments may use a space that is less than about 2 mm, less than about 3 mm, less than about 5 mm, less than about 7 mm, less than about 10 mm, less than about 15 mm, less than about 20 mm, and so forth, depending on the embodiment. The width 404 of the substrate frame 312 may be about 5 mm. In some embodiments, the width 404 the substrate frame 312 may also be between about 5 mm and about 10 mm, between about 10 mm and about mm, between about 15 mm and about 20 mm, between about 20 mm and about 25 mm, between about 25 mm and about 30 mm, between about 30 mm in about 35 mm, between about 35 mm and about 40 mm, and/or greater than about 40 mm, depending on the embodiment. The length 402 of the space 403 may be defined relative to the width 404 of the substrate frame 312. For example, the width 404 of the substrate frame 312 may be greater than or about 5.0 times the length 402 of the space 403. In other embodiments, the width 404 may be greater than or about 2.5 times, greater than or about 7.5 times, greater than or about 10 times, and/or greater than or about 15 times the length 402. These measurement ranges for the width 404 and the length 402 are provided only by way of example and are not meant to be limiting.

Depending on the embodiment, the number of interconnects, the interconnect density, the cavity size, and other design-dependent characteristics, each of these ranges may be more or less appropriate for different assemblies. However, test data has revealed that while increasing the length 402 of the space 403 may continue to alleviate stress, there are diminishing returns after a certain length. For example, some embodiments show a maximum incremental decrease in warpage with the initial 1 mm for the length 402 of the space 403. The incremental decrease in warpage after the initial 1 mm tends to have a decreasing effect on the warpage of the package substrate. Therefore, some embodiments may use an optimal spacing of between about 1 mm and about 2 mm, between about 1 mm and about 3 mm, and between about 1 mm and about 5 mm, depending on the size of the substrate frame and the package substrate to alleviate warpage without unduly restricting the area of the substrate frame to provide interconnects between the substrates.

Figure 5:
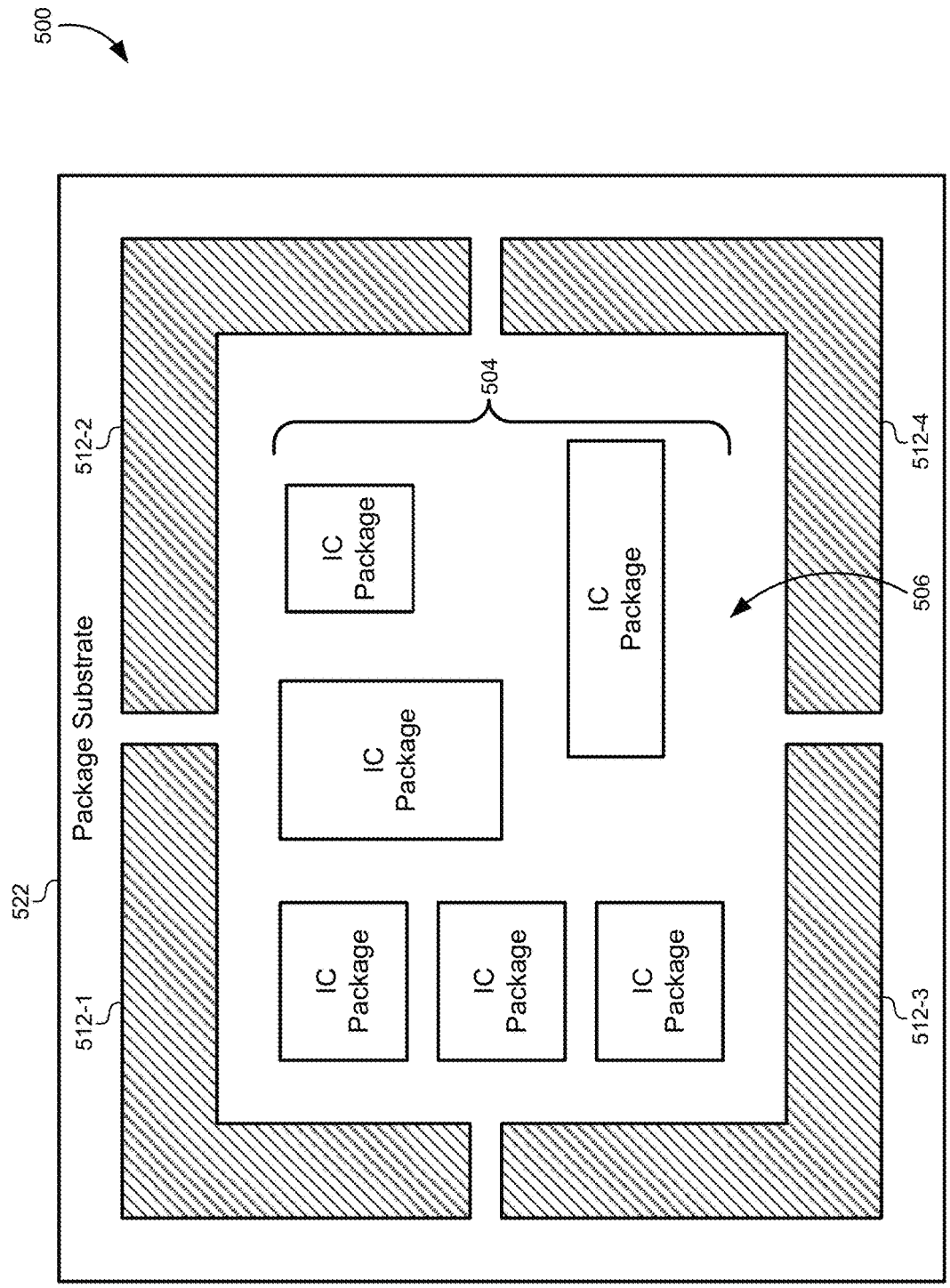
FIG. 5 illustrates a 3D stacked electronic assembly with additional frame sections, according to some embodiments.

FIG. 5 illustrates a 3D stacked electronic assembly 500 with additional frame sections, according to some embodiments. The two frame sections 312-1, 312-2 illustrated above in FIG. 3 are provided only by way of example and are not meant to be limiting. Other embodiments may use additional frame sections and additional locations for the spaces between those frame sections. In the example of FIG. 5, the substrate frame 512 is divided into four individual frame sections 512-1, 512-2, 512-3, 512-4. Other embodiments may include more than four frame sections, such as five frame sections, six frame sections, 10 frame sections, and so forth. As described above, some embodiments may place the spaces between the frame sections such that the frame sections are symmetrical with respect to horizontal, vertical, and/or diagonal axes of the assembly 500.

Although a large number of frame sections may be used, it is been discovered that the largest decrease in the stress/warpage of the package substrate may occur with two frame sections (with two corresponding spaces between the frame sections). Adding additional frame sections may continue to decrease the stress/warpage of the package substrate, however the effect of adding additional frame sections (i.e., adding more spaces to the substrate frame) decreases such that the improvement is not additive, and thus shows decreasing improvement as more frame sections are added. For example, adding the first two spaces to the substrate frame 512 may initially produce a large decrease in the stress/warpage of the package substrate. However, while adding an additional two spaces to a substrate frame that already has four or six spaces may continue to decrease the stress/warpage of the package substrate, the incremental improvement may not be as great. Therefore, electronic assembly designers may balance the improvement provided by adding more spaces to the substrate frame 512 against the area needed for interconnects, the difficulty of manufacturing and assembly, and/or other competing priorities. For example, designs typically use a minimum area for the through-interconnects between the package substrate and the printed circuit board. Therefore, spaces may be added to the substrate frame 512 in some embodiments until the spaces would begin to interfere with the interconnect routing.

Some embodiments may also prioritize maintaining a cavity 506 to protect or isolate the IC packages 504 on the bottom side of the package substrate 522. For example, cryptographic processors or other sensitive electronic components may be placed in the cavity 506 to shield those electronic components from external inspection and prevent unwanted electronic data transmissions from entering or leaving the cavity 506. Therefore, the length of the spaces and the number of frame sections may be limited to, for example, two frame sections or four frame sections in order to preserve the integrity of the cavity 506.

Figure 6:
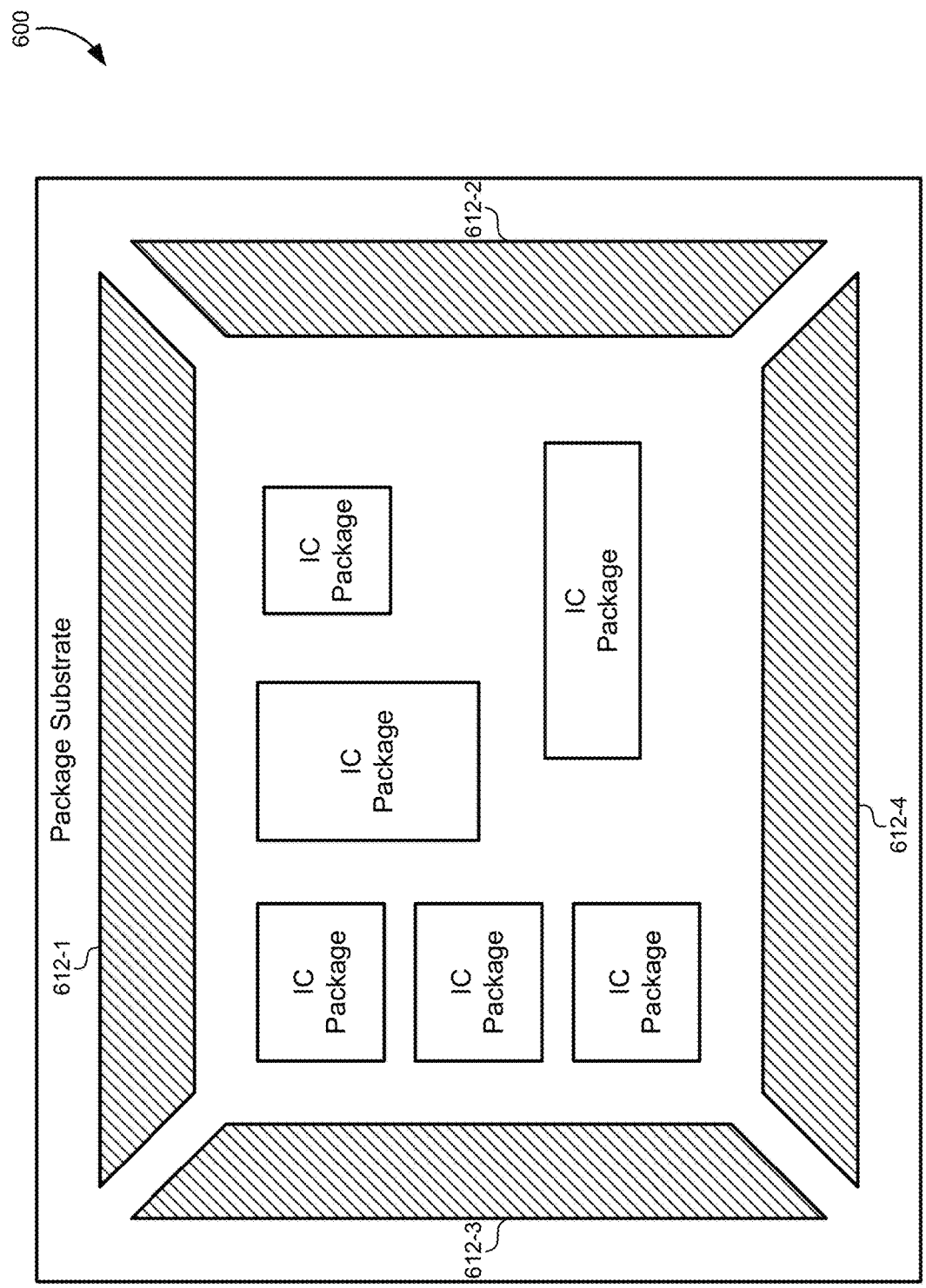
FIG. 6 illustrates a 3D stacked electronic assembly with spaces at the corners of the package substrate, according to some embodiments.

FIG. 6 illustrates a 3D stacked electronic assembly 600 with spaces at the corners of the substrate frame 612, according to some embodiments. This embodiment illustrates how the spaces between the substrate frame sections may be placed at any locations on the substrate frame 612. In this example, the spaces may be placed at the corners of the substrate frame 612. This placement may still maintain the symmetrical arrangement of the frame sections 612-1, 612-2, 612-3, 612-4.

Figure 7:
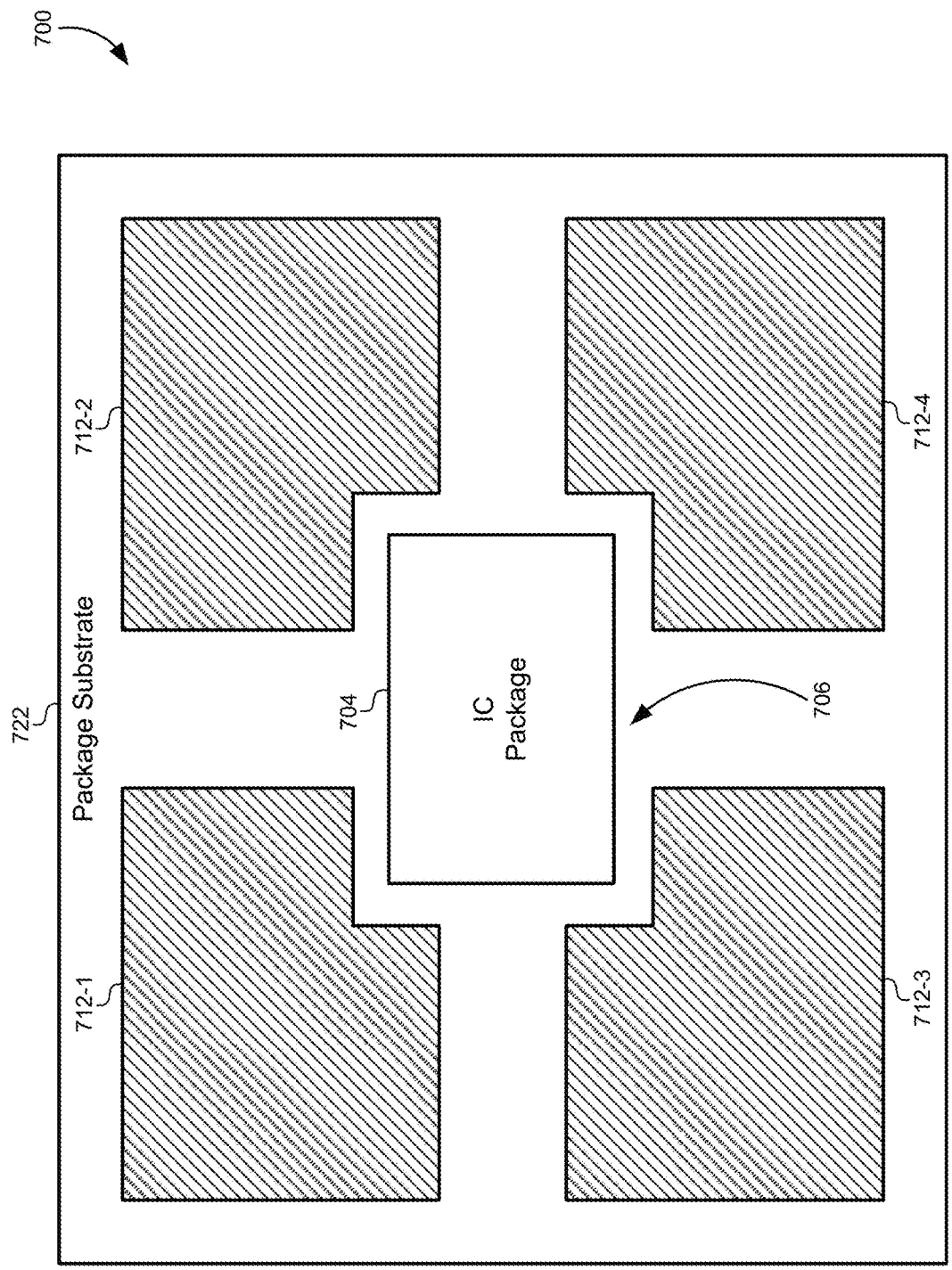
FIG. 7 illustrates an alternative geometry for the substrate frame, according to some embodiments.

FIG. 7 illustrates an alternative geometry for the substrate frame 712, according to some embodiments. In this example, the package substrate 722 may include a single large IC package 704 mounted in the middle of the package substrate 722. The substrate frame 712 may be enlarged to fill the remaining space on the package substrate 722 as needed, while still providing a cavity 706 for the IC package 704. The substrate frame 712 has been divided into four quadrants 712-1, 712-2, 712-3, 712-4, and the length of the spaces between the frame sections may optionally be enlarged as the width of the substrate frame 712 increases. This design may be advantageous when the IC package 704 includes a large number of interconnects, which may in turn need a larger area for the substrate frame 712 to run those interconnects between the substrates.

Figure 8B:
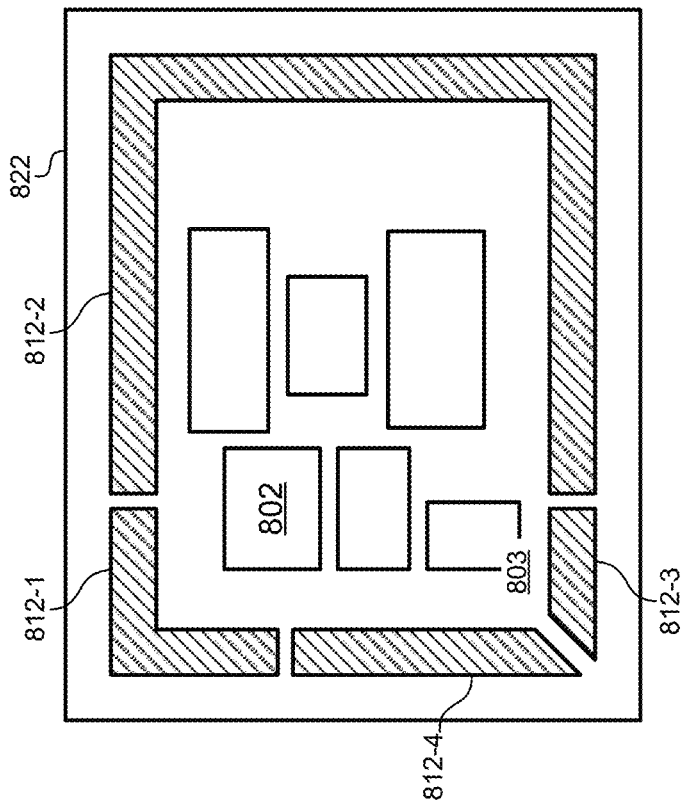
FIG. 8B illustrates a design of a substrate frame that is based on the warpage map, according to some embodiments.
Figure 8A:
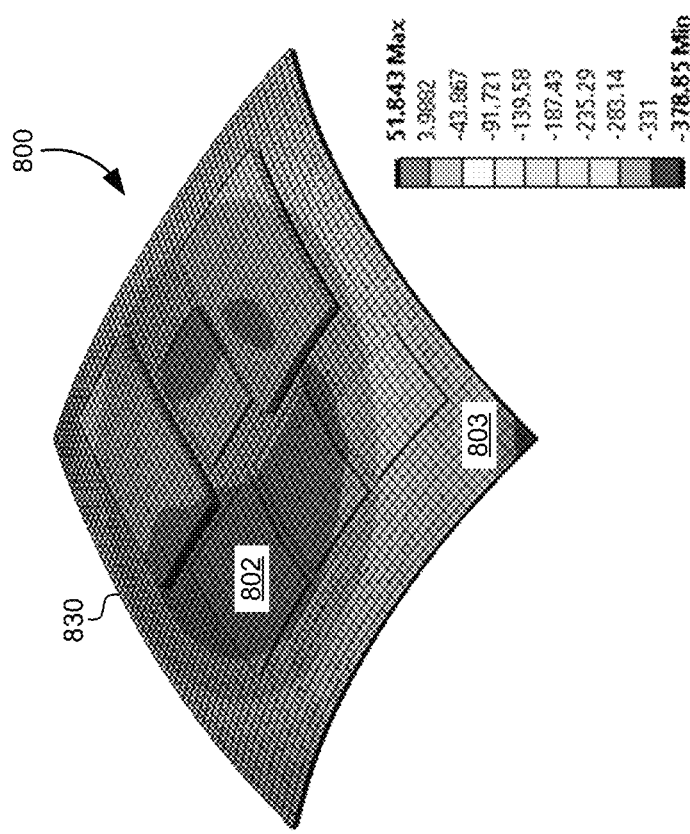
FIG. 8A illustrates a simulation or measurements indicating the warpage of a package substrate, according to some embodiments.

FIG. 8A illustrates a simulation or measurements indicating the warpage of a package substrate 830, according to some embodiments. As described above, the warpage of a package substrate 830 may be measured by a displacement from a baseline flat position for the substrate 830. For example, the substrate 830 may be relatively flat prior to having the IC packages mounted thereon. Measuring the resulting warpage may include measuring the displacement at various locations on the package substrate 830. For example, when designing a substrate frame, a prototype of the package substrate 830 may be fabricated with the IC packages mounted thereon. A warpage map 800 may be generated using a displacement sensor that measures the displacement from a baseline location. The individual measurements may then be compiled into the warpage map 800, which may then be used to design a substrate frame for the design used in mass manufacturing.

Alternatively, instead of physically measuring the displacement of a prototype package substrate 830, some embodiments may simulate the physical properties using a model of the package substrate 830 in order to generate the warpage map 800. For example, 3D models of the package substrate 830 and the IC packages mounted thereon may be simulated using standard simulation software to produce the warpage map 800 that results from the internal and induced stresses on the package substrate 830.

After generating the warpage map 800, locations on the package substrate 830 may be identified with a warpage that exceeds a threshold amount. For example, area 802 corresponds to a first area having a warpage above a first threshold, and area 803 corresponds to a second area having a warpage below a second threshold. In this example, the warpage pattern of the package substrate 830 may represent a "cupping" of the substrate.

FIG. 8B illustrates a design of a substrate frame 812 that is based on the warpage map 800, according to some embodiments. To avoid exacerbating the warpage of the package substrate 830, the spaces in the substrate frame 812 may be located next to the areas 802, 803 exhibiting the greatest warpage on the package substrate 830. For example, the spaces on the sides of the substrate frame 812 may be next to the area 802 in the middle of the package substrate 830. Additionally, a space may be added at the corner of the substrate frame 812 near the area 803. In some embodiments, the locations of the spaces may be identified so that the spaces align on a vertical, horizontal, and/or diagonal axis with the warpage areas.

Figure 9:
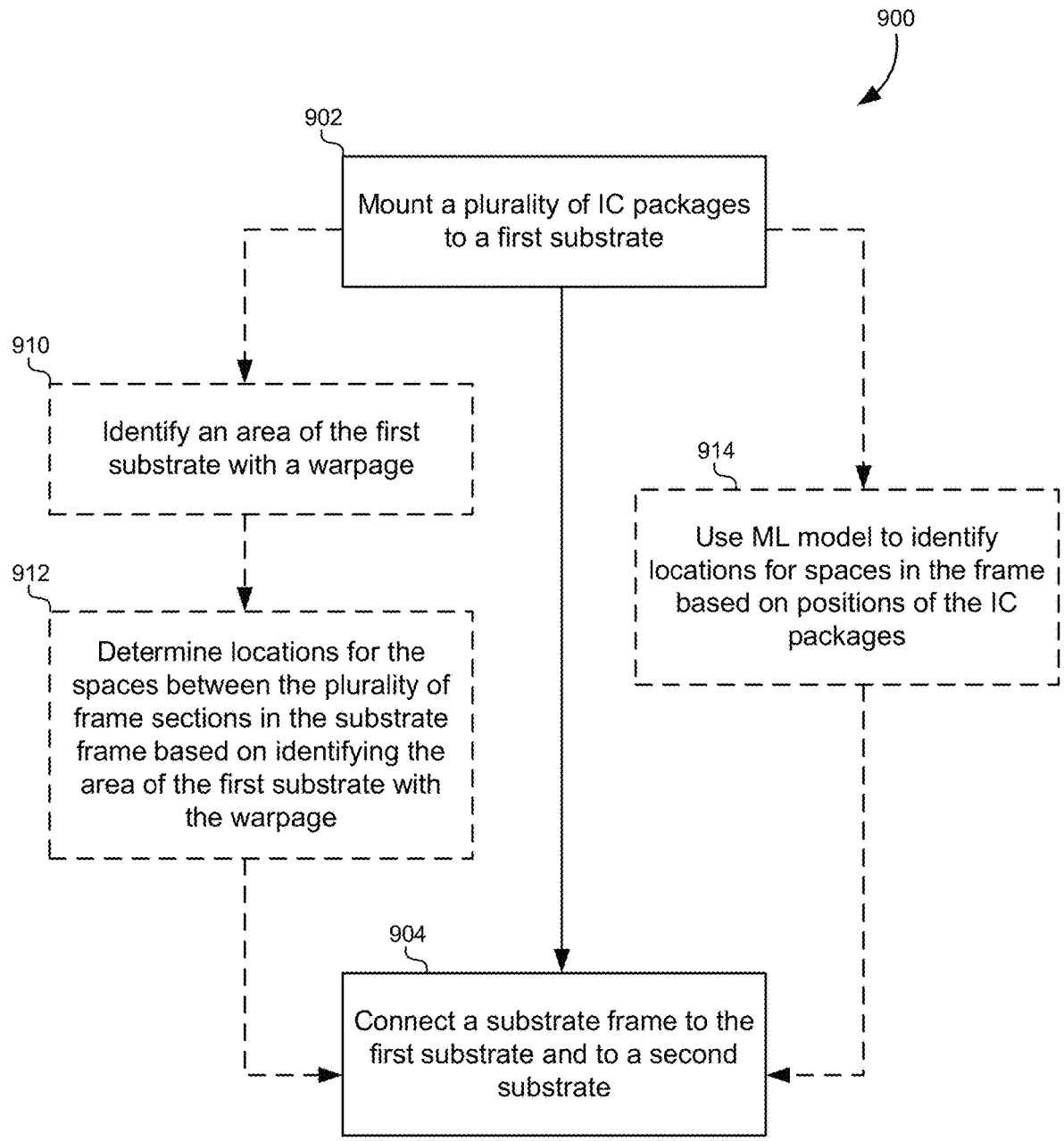
FIG. 9 illustrates a flowchart of a method for assembling a 3D stacked electronic assembly, according to some embodiments.

FIG. 9 illustrates a flowchart 900 of a method for assembling a 3D stacked electronic assembly, according to some embodiments. The method may include mounting a plurality of IC packages to a first substrate (902). As described above, the first substrate may include a package substrate or any other type of substrate. The plurality of IC packages may be mounted to a first, or bottom side of the first substrate. Additionally, a second plurality of IC packages may be mounted to a second, or top side of the first substrate. These packages may be mounted within a footprint or a cavity that is defined by the substrate frame.

In some embodiments, spaces may be placed in the substrate frame to divide the substrate into a plurality of frame sections according to a predetermined design. Alternatively, some embodiments may use an automated process that identifies locations for the spaces in the substrate frame that optimally reduce the warpage in the package substrate. For example, some embodiments may optionally include identifying area of the first substrate with the warpage (910). This area may be identified through a simulation process as described above. This area may also be identified by taking warpage measurements of a package substrate with mounted IC packages or a prototype version of such. This area with the warpage may be one area among a plurality of areas on the substrate with a warpage, each of which may be considered when identifying locations for spaces in the substrate frame. Some embodiments may identify a warpage by comparing the displacement amount to a threshold that is either above or below a baseline location. The method may also optionally identify or determine locations for the spaces between the plurality of frame sections in the substrate frame based on identifying the area of the substrate with the warpage (912). For example, an automated process may place two, three, four, or some predetermined number of spaces in the substrate frame such that they are next to or aligned with the area with the warpage. As described above, the spaces may be aligned on a horizontal or vertical axis that intersects with the area with the warpage. Other embodiments may simulate a plurality of locations for the spaces in the substrate frame in order to identify an optimal placement that minimizes the warpage of the package substrate.

After determining the locations for the spaces that divide the sections of the substrate frame, the method may include connecting the substrate frame to the first substrate and to a second substrate (904). The second substrate may include another package substrate, an interposer, an intermediate layer, a printed circuit board, and/or any other type of substrate.

Figure 10:
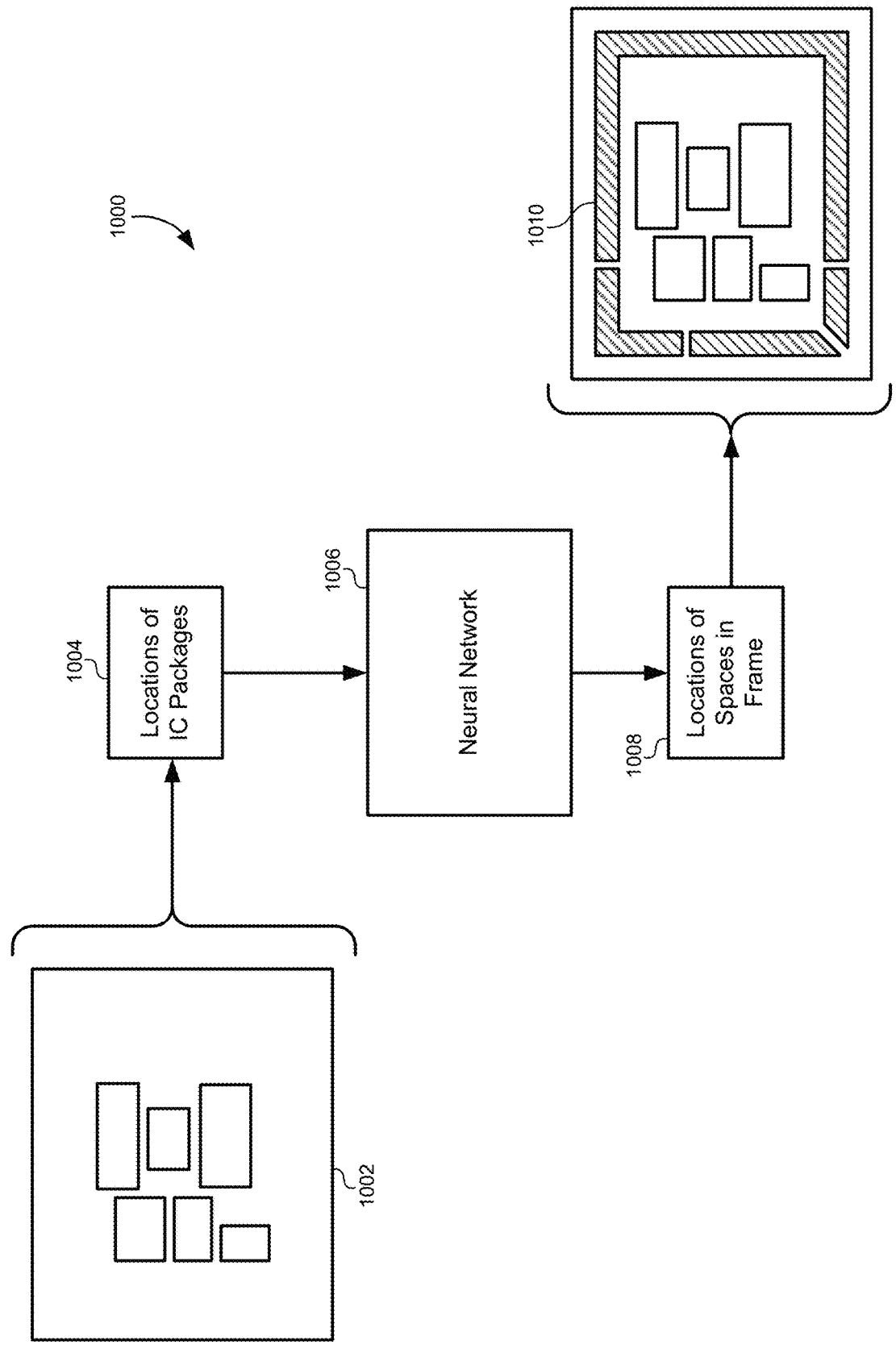
FIG. 10 illustrates a flow diagram for identifying space locations in the substrate frame using a neural network, according to some embodiments.

Alternatively, some embodiments may optionally use a machine-learning process with a neural network to identify locations for the spaces in the substrate frame based on the positions of the IC packages (914). FIG. 10 illustrates a flow diagram 1000 for identifying space locations in the substrate frame using a neural network 1006, according to some embodiments. A neural network 1006 may be trained to accept locations 1004 (e.g., coordinates) of the IC packages on the package substrate 1002. Alternatively, some embodiments may instead train the neural network 1006 as a classification network to receive an image or bitmap of the package substrate 1002 and identify the locations 1004 of the IC packages. This identification may be made in the initial layers of the neural network 1006. Thus, the training process may set the internal weights and parameters of the first layers of the neural network 1006 to identify or classify the locations 1004 of the IC packages.

The final layers of the neural network 1006 may be trained to output a score for different locations 1008 in the substrate frame where spaces should be located in order to minimize warpage on the package substrate 1002. For example, a plurality of different locations may correspond to outputs on the neural network 1006, with each output generating a score (e.g., between 0.0 and 1.0) indicating a preference of the neural network 1006 for locating a space at that location. The locations 1008 of the spaces may be provided as an output to a system engineer for designing the substrate frame. Alternatively, the locations 1008 of the spaces may instead be provided as an input to a computer system that controls an automated process for fabricating the substrate frame. The neural network 1006 may include parameters or constants that may be adjusted to limit the number of spaces or locations of spaces based on design constraints. For example, some designs may restrict spaces from being placed in certain locations based on interconnect requirements. These areas may be provided as a parameter to the neural network 1006 such that spaces are not placed in those areas.

The neural network 1006 may be trained using labeled training data from measured physical designs or from simulated models. For example, some embodiments may generate training data by placing IC packages on the package substrate 1002 in a plurality of different configurations. Simulations may then be performed using different space locations for separating the frame sections of the substrate frame. The resulting simulations may determine whether the warpage of the package substrate 1002 was reduced sufficiently. The reduction of the warpage may be used to label each set of locations as training data for the neural network 1006. Alternatively, the same process may be carried out using a physical prototype with data captured from a displacement sensor.

It should be appreciated that the specific steps illustrated in FIG. 9 provide particular methods of assembling a 3D stack electronic assembly, according to various embodiments. Other sequences of steps may also be performed according to alternative embodiments. For example, alternative embodiments may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

For example, the automated steps 910, 912, 914 of FIG. 9 may all be carried out automatically by a computer system, including simulating the warpage of the substrate frame, identifying locations for spaces in the substrate frame, executing and/or training a neural network or other machine-learning model, and so forth. An example computer system is described below for performing these steps. For example, these steps may be embodied in a set of instructions stored on one or more memory devices (e.g., a non-transitory computer-readable medium) that causes one or more processors to perform the steps.

Figure 11:
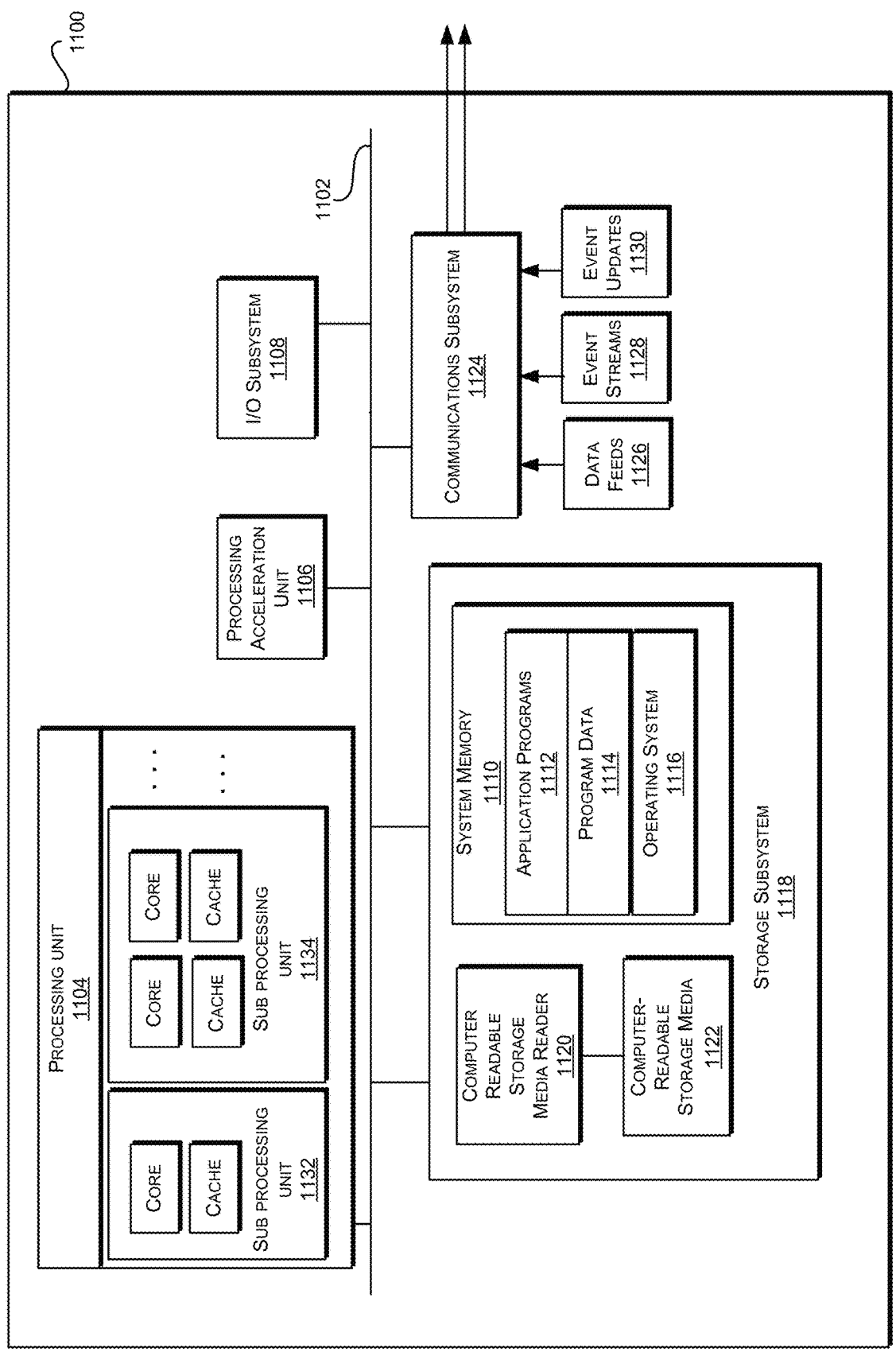
FIG. 11 illustrates an exemplary computer system, in which various embodiments may be implemented.

FIG. 11 illustrates an exemplary computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with some embodiments.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

As used herein, the terms "about" or "approximately" or "substantially" may be interpreted as being within a range that would be expected by one having ordinary skill in the art in light of the specification.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A three-dimensional (3D) stacked electronic assembly comprising:
   a printed circuit board;
   a package substrate comprising a first side and a second side;
   a first plurality of integrated circuit (IC) packages that are mounted to the first side of the package substrate;
   a second plurality of IC packages that are mounted to the second side of the package substrate, wherein the second plurality of IC packages comprises a different number or arrangement of IC packages than the first plurality of IC packages, thereby causing warpage locations in the package substrate; and
   a substrate frame disposed between the printed circuit board and the first side of the package substrate in the 3D stacked electronic assembly, wherein:
   the substrate frame defines a cavity inside of the substrate frame and between the printed circuit board and the package substrate;
   the first plurality of IC packages are mounted to the first side of the package substrate inside of the cavity;
   the second plurality of IC packages are mounted to the second side of the package substrate within a footprint of the cavity;
   the substrate frame is divided into a plurality of frame sections that are separated by spaces between the plurality of frame sections; and
   the spaces between the plurality of frame sections of the substrate frame are located next to the warpage locations in the package substrate to reduce warpage.

2. The electronic assembly of claim 1, wherein the printed circuit board extends beyond a footprint of the package substrate.

3. A substrate frame for a three-dimensional (3D) stacked electronic assembly, the substrate frame comprising:
   a first side comprising first interconnects configured to mount to a first side of a first substrate with a first plurality of integrated circuit (IC) packages mounted to the first side of the first substrate, and a second plurality of IC packages mounted to a second side of the first substrate, wherein the second plurality of IC packages comprises a different number or arrangement of IC packages than the first plurality of IC packages, thereby causing warpage locations in the first substrate;

a second side comprising second interconnects configured to mount to a second substrate such that the substrate frame is disposed between the first substrate and the second substrate in the 3D stacked electronic assembly and a cavity is defined inside of the substrate frame and between the first substrate and the second substrate in which the first plurality of IC packages are mounted, wherein the second plurality of IC packages are mounted to the second side of the first substrate within a footprint of the cavity; and a plurality of frame sections that are separated by spaces between the plurality of frame sections, wherein the spaces between the plurality of frame sections are located next to the warpage locations in the first or second substrate to reduce warpage.

4. The substrate frame of claim 3, wherein the substrate frame has a rectangular shape.

5. The substrate frame of claim 3, wherein the spaces that separate the plurality of frame sections are located on sides of the substrate frame.

6. The substrate frame of claim 3, wherein the spaces that separate the plurality of frame sections are located at corners of the substrate frame.

7. The substrate frame of claim 3, wherein a width of the plurality of frame sections is maintained across the spaces between the plurality of frame sections.

8. The substrate frame of claim 3, wherein the spaces between the plurality of frame sections are located in the substrate frame such that the substrate frame is symmetrical relative to an axis.

9. The substrate frame of claim 3, wherein a width of the plurality of frame sections is at least five times greater than a length of the spaces between the plurality of frame sections.

10. A method of assembling a three-dimensional (3D) stacked electronic assembly, the method comprising:
mounting a first plurality of integrated circuit (IC) packages to a first side of a first substrate;
mounting a second plurality of IC packages to a second side of the first substrate, wherein the second plurality of IC packages comprises a different number or arrangement of IC packages than the first plurality of IC packages, thereby causing warpage in the first substrate;
identifying one or more areas of the first substrate with the warpage;
determining locations for spaces between a plurality of frame sections in a substrate frame that reduce the warpage; and
connecting the substrate frame to the first side of the first substrate and to a second substrate, wherein:
the substrate frame defines a cavity inside of the substrate frame and between the first substrate and the second substrate;
the first plurality of IC packages are mounted to the first side of the first substrate inside of the cavity;
the second plurality of IC packages are mounted to the second side of the first substrate within a footprint of the cavity; and
the substrate frame is divided into the plurality of frame sections that are separated by spaces between the plurality of frame sections.

11. The method of claim 10, wherein identifying the one or more areas of the first substrate with the warpage comprises measuring a displacement of the first substrate after mounting the first plurality of IC packages and the second plurality of IC packages to the first substrate relative to a displacement of the first substrate before mounting the first plurality of IC packages and the second plurality of IC packages to the first substrate.

12. The method of claim 10, wherein identifying the one or more areas of the first substrate with the warpage comprises simulating a 3D model of the first substrate with the first plurality of IC packages and the second plurality of IC packages mounted to the first substrate.

13. The method of claim 10, wherein determining the locations for the spaces between the plurality of frame sections in the substrate frame is based on output provided by a machine-learning model that is trained to receive locations of the first plurality of IC packages and the second plurality of IC packages and to output the locations for the spaces.

14. The method of claim 11, further comprising measuring the displacement of the first substrate after connecting the substrate frame to the first substrate to determine whether the displacement has been reduced by mounting the first substrate to the substrate frame.

15. The method of claim 12, further comprising simulating the 3D model of the substrate frame connected to the 3D model of the first substrate to determine whether the warpage has been reduced by adding the 3D model of the substrate frame.

* * * * *